United States Patent [19]

Yabu et al.

[11] 4,211,964
[45] Jul. 8, 1980

[54] SPEED CONTROL CIRCUIT

[75] Inventors: Toshiomi Yabu, Shimohonnojimaemachi; Tatsuo Wada, Osaka; Kouichi Yamada, Higashiosaka; Tadashi Yoshino, Hirakata, all of Japan

[73] Assignee: Matsushita Electric Industrial Co., Ltd., Osaka, Japan

[21] Appl. No.: 7,247

[22] Filed: Jan. 29, 1979

[30] Foreign Application Priority Data

| Jan. 31, 1978 | [JP] | Japan | 53-10100 |
| May 12, 1978 | [JP] | Japan | 53-56918 |
| May 24, 1978 | [JP] | Japan | 53-62735 |

[51] Int. Cl.² ............................................. H02P 5/16
[52] U.S. Cl. .................................... 318/314; 318/318; 318/327
[58] Field of Search ............... 318/326, 327, 314, 318, 318/328

[56] References Cited

U.S. PATENT DOCUMENTS

| 3,586,946 | 6/1971 | Sadashige et al. | 318/326 |
| 3,657,624 | 4/1972 | Nagano | 318/327 |
| 3,952,237 | 4/1976 | Kimizuka | 318/314 |
| 4,081,728 | 3/1978 | Nikami et al. | 318/318 |
| 4,109,184 | 8/1978 | Weber | 318/327 |

Primary Examiner—David Smith, Jr.
Attorney, Agent, or Firm—Stevens, Davis, Miller & Mosher

[57] ABSTRACT

This invention relates to a speed control circuit of a d.c. motor having a frequency generator. To the conventional method in which a rotation detection signal is delayed by a monostable multivibrator circuit and this delayed signal and the rotation detection signal are gated to obtain a speed error signal, a new time-voltage converter circuit is added, whereby even if the detected frequency of the generator is low, a stable speed control is possible. Because of no error synchronization, the present speed control circuit is suited to an apparatus which requires speed switching, and also to semiconductor integration.

8 Claims, 17 Drawing Figures

SPEED CONTROL CIRCUIT

FIELD OF THE INVENTION

This invention relates to a speed control circuit of a d.c. motor having a frequency generator, and more particularly to a speed control circuit suited to an apparatus which requires speed switching, and to semiconductor integration.

Background and preferred embodiments of this invention will be explained hereinafter with reference to the accompanying drawings.

PRIOR ART OF THE INVENTION

In order to understand the present invention, an explanation of the prior art will be made.

Figure 1:
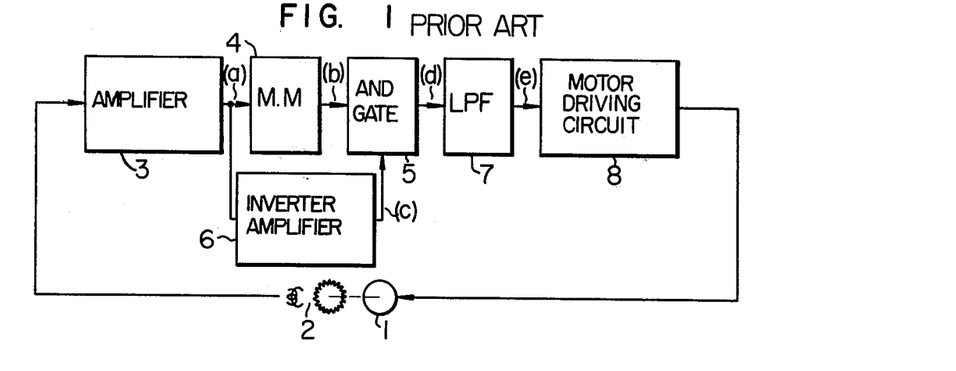
FIG. 1 shows a constitution of a prior art speed control method in a block diagram.
Figure 2:
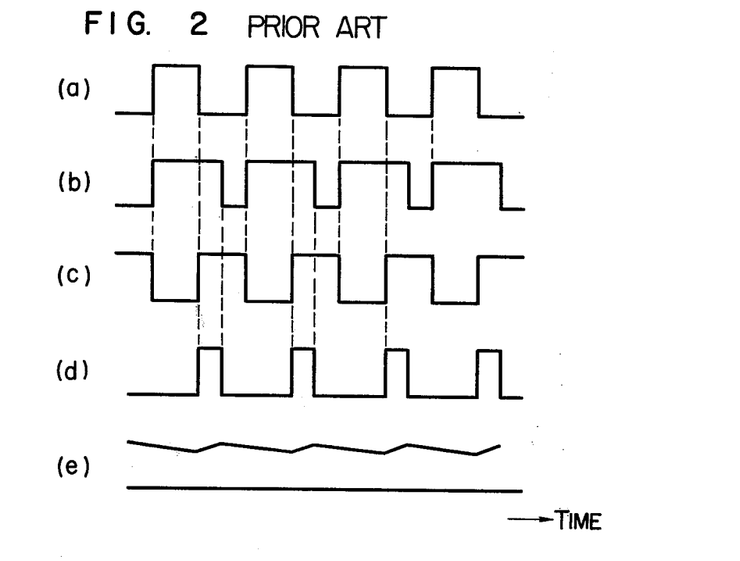
FIG. 2 shows the waveform at each part.

In the prior art speed control of a d.c. motor, a pulse width comparison method using a frequency generator as shown in FIG. 1 has been used. In FIG. 1, the output signal of a frequency generator 2 directly coupled to a d.c. motor 1 is amplified and shaped by an amplifier 3. A monostable multivibrator circuit 4 using a prescribed metastable period is triggered by a front edge of the above output signal (see FIG. 2(a)). The resulting signal (FIG. 2(b)) is supplied to an input of an AND gate circuit 5.

Further, the output signal (FIG. 2(c)) of the amplifier 3 is inverted by an inverter amplifier 6, and applied to another input of the AND gate circuit 5. The AND gate circuit performs an AND operation of the two input signals and yields a speed error signal having a pulse shape (FIG. 2(d)).

When the d.c. motor starts, the period of the output signal of the frequency generator 2 is longer than the metastable period of the output signal of the monostable multivibrator circuit (MM) 4. Hence, the AND gate circuit provides no output. However, when the RPM of the d.c. motor increases and reaches a prescribed value, the rear edge of the output signal of the frequency generator 2 appears in the metastable period of the output signal of the monostable multivibrator circuit 4, and hence the AND gate circuit 5 provides an output signal having a pulse shape.

The output signal of the AND gate circuit is smoothed by a low pass filter 7. The output signal of the low pass filter 7 (FIG. 2(e)) is amplified by a motor driving circuit 8 to drive the d.c. motor 1. The motor driving circuit 8 accelerates the d.c. motor 1 when its input level is low, and decelerates it when its input level is high. By the formation of such a closed loop as described above, the RPM of the d.c. motor 1 can be adjusted at a constant value corresponding to a monostable period set by the monostable multivibrator circuit 4. FIG. 2 shows the waveform at each part of FIG. 1.

In the above method, since the output of the speed comparison error signal is a pulse signal, a low pass filter is used to smooth it and also to compensate the speed control loop. However, the characteristic of the low pass filter for an optimum compensation of the loop does not agree with that of the low pass filter for suppressing the rotation irregularity of the d.c. motor arising from ripples after smoothing.

Furthermore, if the output frequency of the frequency generator at a prescribed RPM of the d.c. motor is low, it was necessary to make the cut-off frequency of the low pass filter sufficiently low in order to reduce the rotation irregularity. In this case, the time required for the motor to reach a constant speed from start becomes long due to a deterioration of the transient response of the low pass filter. So, the method has a defect of long pull-in time.

Figure 3:
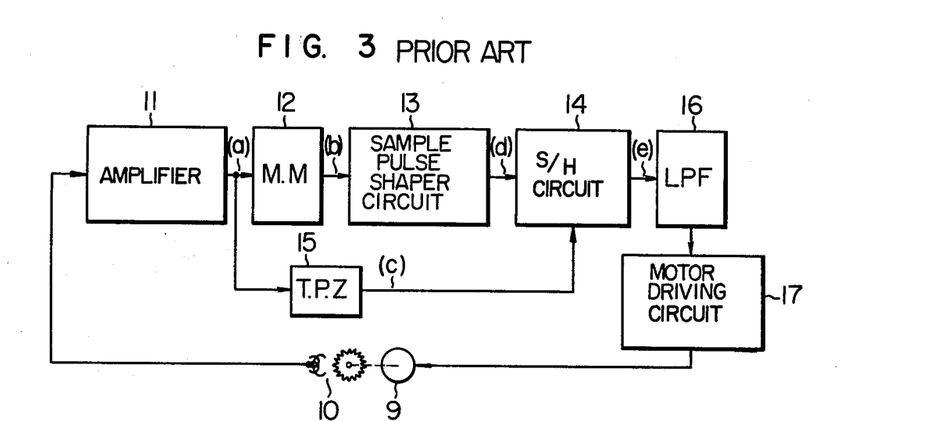
FIG. 3 is a block diagram showing the constitution of another prior art speed control method.
Figure 4:
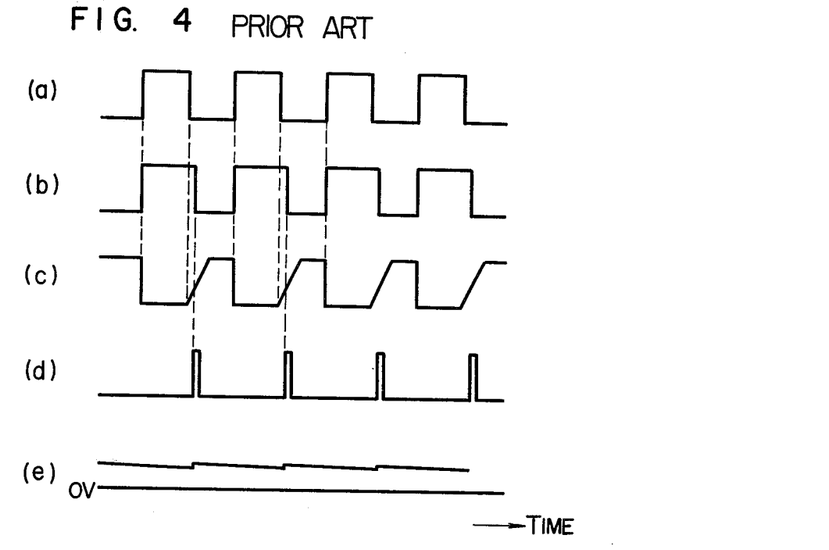
FIG. 4 shows the waveform at each part.

Next, explanation will be made of an example of another prior art apparatus which improves the above defect. In this speed control circuit shown in FIG. 3, the output signal of a frequency generator 10 directly coupled to a d.c. motor 9 is amplified and shaped by an amplifier 11. A monostable multivibrator circuit 12 having a prescribed metastable period is triggered by a front edge of the above output signal (FIG. 4(a)). The output signal (FIG. 4(b)) of the MM circuit 12 is supplied to a sample pulse shaper circuit 13 to form a sample pulse (FIG. 4(d)), which is supplied to a sample-hold circuit 14. The output signal of the amplifier 11 is supplied also to a trapezoid waveform shaper circuit 15 to form a trapezoid wave (FIG. 4(c)). Sampling is done by the above sample pulse and the sample-hold circuit 14 to obtain a d.c. voltage output (FIG. 4(e)) as a speed error signal.

When the d.c. motor 9 starts, the period of the output signal of the frequency generator 10 is longer than the metastable period of the output of MM circuit 12. Hence, the output of the sample-hold circuit 14 is "L". When the RPM of the d.c. motor 9 increases and reaches a prescribed value, the trapezoid waveform formed by a read edge of the output signal of the frequency generator 10 appears in a metastable period of MM circuit 12 so that the sample-hold circuit 14 provides a d.c. voltage depending on the RPM as its output signal. Thus, in the speed controlled state, a stable voltage with little ripple is obtained. This signal is amplified by a motor driving circuit 17 through a control compensating low pass filter 16 to drive the d.c. motor 9.

Figure 5:
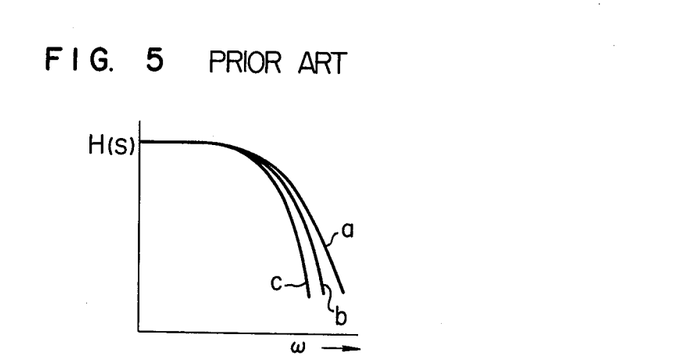
FIG. 5 shows a variation of the transfer characteristic with the width of a sampling pulse in the prior art method shown in FIG. 3.

In this second prior art speed control circuit, ripple is less than in the first prior art circuit. The control compensation low pass filter 16 can be designed more freely. Further, it is possible to fully reduce the pull-in time of the motor. However, if the control circuit is to be made as an integrated semiconductor, it is necessary to reduce the externally fixed components and the number of pins as much as possible, and a sampling pulse shaper circuit for sampling free from the necessity of pins is desired. It is extremely difficult to obtain such a pulse shaper circuit having a pulse width stable against temperature, with small variation in pulse width and no need for a number of pins. Moreover, it is not possible to realize a transfer characteristic of the sample-hold circuit 14 without any deterioration at all the frequencies of the frequency generator 10. FIG. 5 shows the transfer characteristic with a variation of a sample pulse width and a transfer function of the sample-hold circuit given by $$H(S) = 1/S(1 - e^{-ST}).$$

In FIG. 5, curve a shows the transfer characteristic with a wide sample pulse width, while curves b and c show transfer characteristics with a narrower and narrowest sample pulse width respectively. As apparent from this figure, the transfer characteristic becomes worse as the sample pulse width becomes narrower. In the sampling method, considering a case when the speed is switched to a half value, by providing an additional flip-flop circuit, the RPM can be switched depending on whether the output of the amplifier 11 has passed through the flip-flop circuit or not. The sampling pulse is formed at a rear edge of the MM circuit 12 and supplied to the sample-hold circuit 14 at a constant position with respect to the input signal. Therefore, when the rotation speed is switched, the frequency of the trapezoid wave varies. So, it happens that all the voltages of the trapezoid wave are sampled till a set speed is reached. Therefore, the defect of the above method is an error synchronization at a value other than the set one.

SUMMARY OF THE INVENTION

An object of this invention is to provide a stable speed control circuit for reducing the ripples of a speed error signal.

Another object of this invention is to provide a speed control circuit which constitutes a control system without any change of a sample pulse hold output and particularly is conveniently integrated.

A further object of this invention is to provide a speed control circuit for removing error synchronization at the time of switching speed.

In the present invention a rotation detection signal of a rotating body is delayed by a monostable multivibrator circuit, and the delayed signal and the rotation detection signal are gated to obtain a speed error signal, and as the speed error signal is converted to a d.c. voltage by a time-voltage converter circuit, a voltage having very little ripple is obtained as the speed error signal. Accordingly, a low pass filter for loop compensation can be made optimum, and the rotation of a d.c. motor is stabilized because of little ripple and no rotation irregularity occurs. And, as such a signal nearly equal to a d.c. voltage is obtained as the speed error signal, the output frequency of a frequency generator can be lowered, and it is very effective for controlling a motor of slow speed rotation.

Furthermore, since sampling to obtain the speed error signal is performed over the whole width of the upper end portion of the output signal of the time-voltage converter circuit, the sampling does not depend on the frequency of an input frequency generator. And, when the control circuit is formed as an integrated circuit, as dispersion of a sample pulse width does not occur, a very good transmission characteristic can be theoretically ensured. Accordingly, very stable speed control of a d.c. motor can be realized.

DESCRIPTION OF THE PREFERRED EMBODIMENTS

Figure 6:
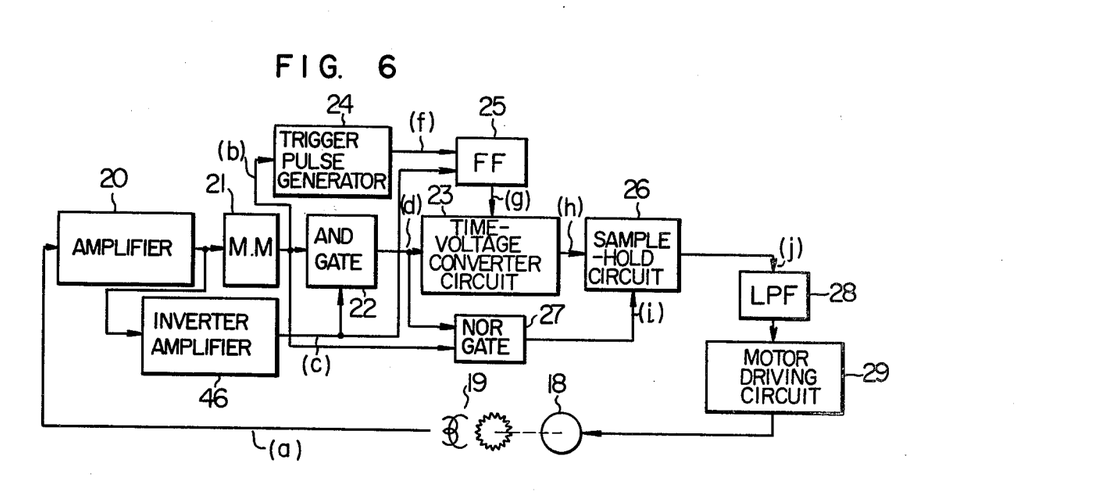
FIG. 6 is a block diagram showing a fundamental constitution of this invention.
Figure 7:
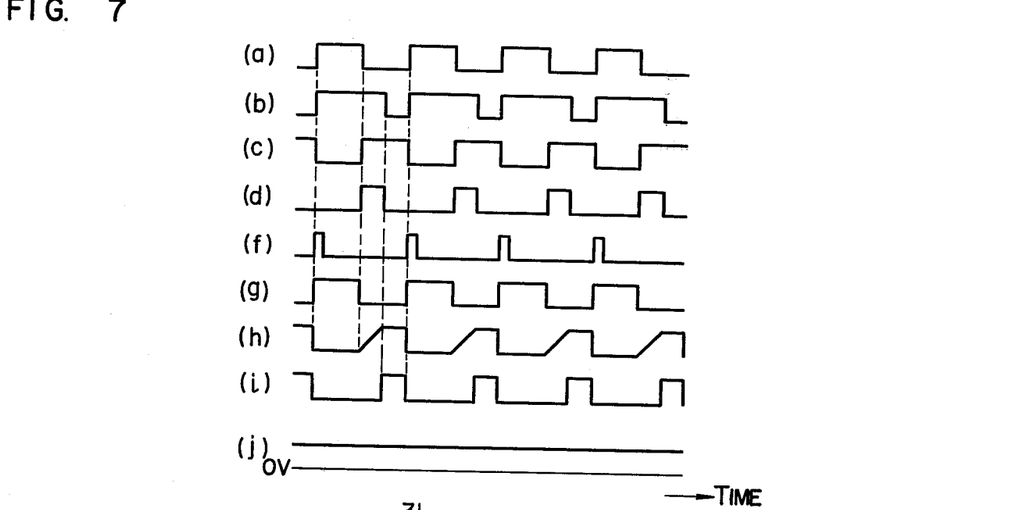
FIG. 7 shows the waveform at each part.

The constitution of a speed control circuit of this invention will be explained with reference to FIGS. 6 and 7.

The output signal from a frequency generator 19 directly coupled to a motor 18 is amplified and shaped by an amplifier 20. The output signal FIG. 7(a) of the amplifier 20 triggers an MM circuit 21 having a prescribed metastable period. An AND gate circuit 22 is AND gated by the output signal (FIG. 7(b)) of the MM circuit and an output signal (FIG. 7(c)) of an inverter amplifier 46 which is obtained by inverting the output signal of the amplifier 20. The output signal of the AND gate circuit is a pulse shaped speed error signal (FIG. 7(d)). The signal is supplied to a time-voltage converter circuit 23, which charges a constant current in a condenser during the appearance of the speed error pulse, to obtain a trapezoid wave (FIG. 7(h)). A pulse with a narrow width (FIG. 7(f)) is generated at a front edge of the output signal (FIG. 7(b)) of the MM circuit 21 by a trigger pulse generating circuit 24. The output signal (FIG. 7(f)) of the trigger pulse generating circuit 24 is supplied to a set terminal of flip-flop circuit (FF) 25 having set and reset terminals. The output signal (FIG. 7(c)) of the inverter amplifier 46 is supplied to the reset terminal of the FF circuit 25. The time voltage converter circuit 23 is reset by the output signal (FIG. 7(g)) of the FF circuit 25. The output signal (FIG. 7(h)) of a time-voltage converter circuit 23 is supplied to a sample-hold circuit 26. The sampling pulse of the sample-hold circuit 26 is the output signal (FIG. 7(i)) of a NOR gate circuit 27 which is gated by the output signal (FIG. 7(d)) of the AND gate circuit 22 and the output signal (FIG. 7(b)) of the MM circuit 21. In the sample-hold circuit 26, the output signal (FIG. 7(h)) of the time-voltage converter circuit 23 is sampled by the output signal (FIG. 7(i)) of the NOR gate 27, and this voltage is held. The output signal (FIG. 7(j)) of the sample-hold circuit 26 is a d.c. voltage related to the rotation of the d.c. motor 18 which is stable with little ripple under the condition of controlled speed. The speed error signal, or the output signal of the sample-hold circuit 26 is amplified by a motor driving circuit 29 through a control compensating low pass filter 28 to drive the d.c. motor 18, as in the prior art.

Here, the sampling pulse is obtained by NOR gating the output signal of the MM circuit 21 and the output signal of the AND gate 22. The reason for this is to form a pulse signal having a sampling pulse width always in the period of the upper end portion of the output signal of the time-voltage converter circuit 23, even if the transmission delay time of the operation of each circuit section is large. In the case of integrating the above speed control circuit by semiconductors with a fast transistor switching speed, a small internal distribution capacitance and a negligibly small signal transmission delay time, if the period of "LOW" voltage of the output signal (FIG. 7(b)) of the MM circuit 21 and the period of the beginning end portion of the trapezoid wave of the output signal (FIG. 7(h)) of the time voltage converter circuit 23 coincide with each other, the NOR gate 27 can be omitted and the circuit can be simplified by using the "Low" period of the output signal of the MM circuit 21 as the sampling pulse.

Figure 8:
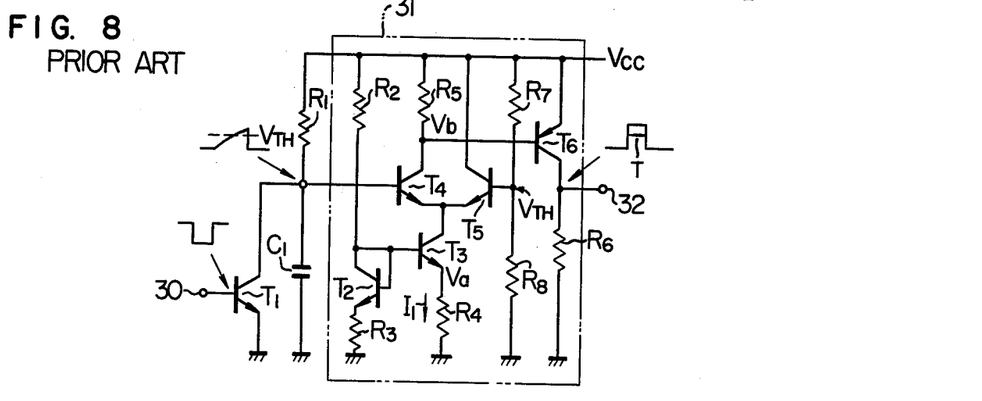
FIG. 8 shows a prior art monostable multivibrator circuit.

Next, explanation will be made of a monostable multivibrator (MM) circuit which is a constituent element of this invention. FIG. 8 shows an MM circuit using a differential detection circuit as has been customarily employed. When a signal to be delayed is supplied to a terminal 30 and provided to the base of a transistor $T_1$, the transistor $T_1$ turns "off" during the width of the pulse. Then, a current is charged in a capacitor $C_1$ through a resistor $R_1$ connected to a power supply $V_{cc}$. The waveform at the collector of the transistor $T_1$ has an integrated form. This signal is supplied to a differential detection circuit 31 and a delayed output is obtained. In the differential detection circuit 31, the d.c. voltage source $V_{cc}$ is connected through a resistor $R_2$ to the base and the collector of a transistor $T_2$, and the emitter of the transistor $T_2$ is grounded through a resistor $R_3$. The emitter of a transistor $T_3$ whose base is connected to the base of the transistor $T_2$ is grounded through a resistor $R_4$, while the collector of the transistor $T_3$ is connected to the emitters of transistors $T_4$ and $T_5$ commonly connected. The collector of the transistor $T_4$ is connected to the voltage source $V_{cc}$ through a resistor $R_5$, while its collector is connected to the base of a transistor $T_6$ whose collector is grounded through a resistor $R_6$. The collector of the transistor $T_5$ is connected to the voltage source $V_{cc}$. The above-mentioned integrated signal is applied to the base of the transistor $T_4$. A d.c. voltage $V_{TH}$ divided by resistors $R_7$ and $R_8$ is applied to the base of the transistor $T_5$. In this arrangement, a delayed signal is derived at a connection point between the collector of the transistor $T_6$ and the resistor $R_6$.

The operation of the circuit will be explained now on the assumption that the d.c. voltages applied to the bases of transistors $T_4$ and $T_5$ are equal. Then, the emitter voltage $V_a$ of the transistor $T_3$ becomes $$V_a \approx \frac{(V_{cc} - V_{BE}[T_2]) \cdot R_3}{R_2 + R_3} + V_{BE}[T_2] - V_{BE}[T_3] \quad (1)$$
$$\approx \frac{(V_{cc} - V_{BE}[T_2]) \cdot R_3}{R_2 + R_3}$$

The current flowing through the resistor $R_4$ is given by $$I_1 \approx \frac{(V_{cc} - V_{BE}[T_2]) \cdot R_3}{(R_2 + R_3) \cdot R_4} \quad (2)$$

Thus, the collector voltage $V_b$ of the transistor $T_4$ becomes $$V_b = V_{cc} - \frac{(V_{cc} - V_{BE}[T_2]) \cdot R_3}{2 \cdot (R_2 + R_3) \cdot R_4} \cdot R_5 \quad (3)$$

The level swing of $V_b$ is given by the integrated input times the a.c. differential gain $A_v$ which is usually expressed by $$A_v = g_m \cdot R_5 / 2$$

The mutual conductance $g_m$ is given by $$g_m = I_1 2 \cdot V_T,$$

where by definition $V_T = K \cdot T / q$, K is the Boltzmann constant ($1.38 \times 10^{-23}$ W·S/°C.), T is the absolute temperature (°K.), and q is the electronic charge ($1.6 \times 10^{-19}$ coulomb). At a room temperature 300° K. (=27° C.), the thermal voltage $V_T$ becomes 26 mV. So, we have $$A_v = I_1 \cdot R_5 / 4 \times 26 [mV] \quad (4)$$

The collector output of the transistor $T_4$ is switched by the transistor $T_6$, at the collector of which a rectangular waveform is obtained. It is only with difficulty that the variation of $V_{BE}$ due to a temperature variation of the transistor $T_6$ coincides with that of the collector voltage $V_b$ of the transistor $T_4$ due to a temperature variation. Furthermore, since the a.c. gain varies with temperature, it is unavoidable that the width of the pulse obtained at the collector of the transistor $T_6$ has a temperature variation.

In a monostable multivibrator circuit according to this invention, a differential detection circuit free from the above defects is used. Explanation of the circuit will be explained next with reference to FIG. 9, where the base and the collector of a transistor $T_7$ are connected to a d.c. voltage source $V_{cc}$ through a resistor $R_7$ and its emitter is connected to the emitter of a transistor $T_8$ whose collector and base are grounded. To a connection point between the resistor $R_7$ and the base of a transistor $T_7$ is connected the base of the transistor $T_9$ whose emitter is grounded through an emitter resistor $R_8$ and collector is connected to a connection point of the emitters of the transistors $T_{10}$ and $T_{11}$. The collector of the transistor $T_{10}$ is connected to the voltage source $V_{cc}$ through a resistor $R_9$. To a connection point between the collector of the transistor $T_{10}$ and the resistor $R_9$ is connected the base of a transistor $T_{12}$ whose emitter is connected to the voltage source $V_{cc}$ and collector is grounded through a resistor $R_{10}$. The collector of a transistor $T_{11}$ is connected to $V_{cc}$. An integrated signal is applied to the base of the transistor $T_{10}$. A d.c. voltage $V_{TH}$ divided by resistors $R_{11}$ and $R_{12}$ is applied to the base of the transistor $T_{11}$. An output is derived from a connection point between the collector of the transistor $T_{12}$ and the resistor $R_{10}$.

Figure 9:
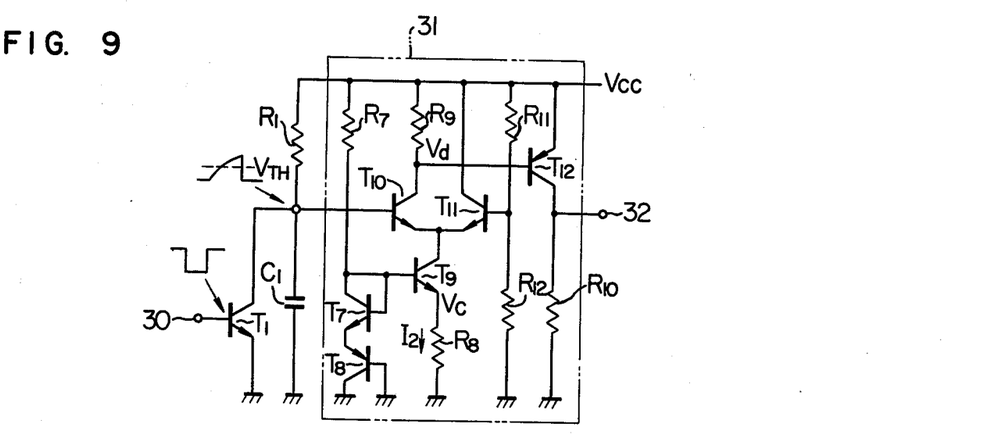
FIG. 9 shows a novel monostable multivibrator used in this invention.

The operation of the circuit will be explained now on the assumption that the d.c. voltages applied to the transistors $T_{10}$ and $T_{11}$ are equal. Then, the emitter voltage $V_c$ of the transistor $T_9$ becomes $$V_c \approx V_{BE}[T_7] + V_{BE}[T_8] - V_{BE}[T_9] \approx V_{BE}[T_8] \quad (5)$$

where $T_7$ and $T_9$ are the same type NPN transistors. The current $I_2$ is given by $$I_2 \approx \frac{V_{BE}[T_8]}{R_8} \quad (6)$$

Thus, the collector voltage $V_d$ of the transistor $T_{10}$ becomes $$V_d \approx V_{cc} - \frac{I_2}{2} \cdot R_9 \qquad (7)$$

$$\approx V_{cc} - \frac{V_{BE}[T_8] \cdot R_9}{2 \cdot R_8}$$

The voltage swing of $V_d$ becomes the integrated signal input times the a.c. gain $A_v$, which is given by $$A_v = \frac{I_2 \cdot R_9}{4 \times 26[mV]} \qquad (8)$$

In the above arrangement, if it is set such that $$R_9 : R_8 = 2 : 1 \qquad (9)$$

from the equation (8) the collector voltage $V_d$ becomes $$V_d \approx V_{cc} - \frac{V_{BE}[T_8] \cdot R_9}{2 \cdot R_8} \qquad (10)$$

$$\approx V_{cc} - V_{BE}[T_8]$$

Namely, since $V_d$ is always equal to the switching voltage of the transistor $T_{12}$, and the transistors $T_{12}$ and $T_8$ are chosen to be the same type PNP transistors, the waveform shaping can be made at a zero crossing point even with a temperature variation. Due to the shaping at the zero crossing point, the delayed output is independent of a.c. gain and temperature variations and thus becomes stable.

Next, explanation will be made of a trigger pulse generating circuit which is a constituent element of this invention.

When a trigger pulse with a relatively large width is generated in a semiconductor integrated circuit, it was necessary to connect a CR differentiation circuit externally. The problem was that an increase of external terminals raises the manufacturing cost.

This invention solves this problem and provides a trigger pulse generating circuit which can generate a delayed pulse by an input pulse signal with a relatively large pulse width.

Figure 10:
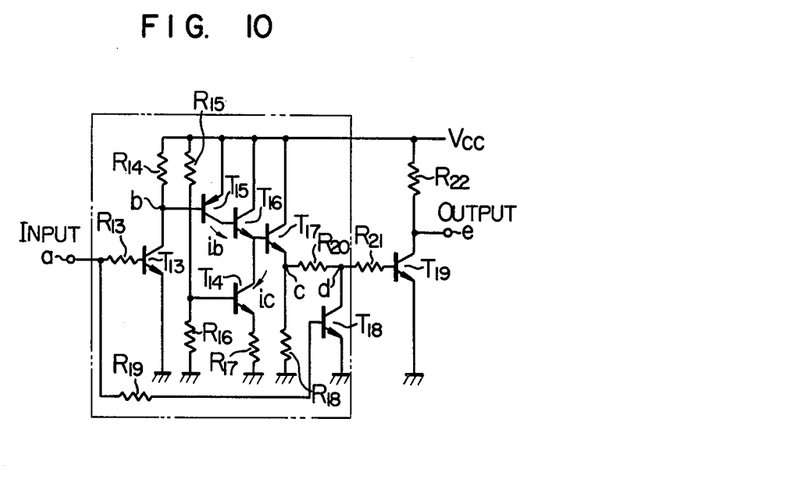
FIG. 10 shows a circuit diagram of a trigger pulse generating circuit which is a constituent element of this invention.
Figure 11:
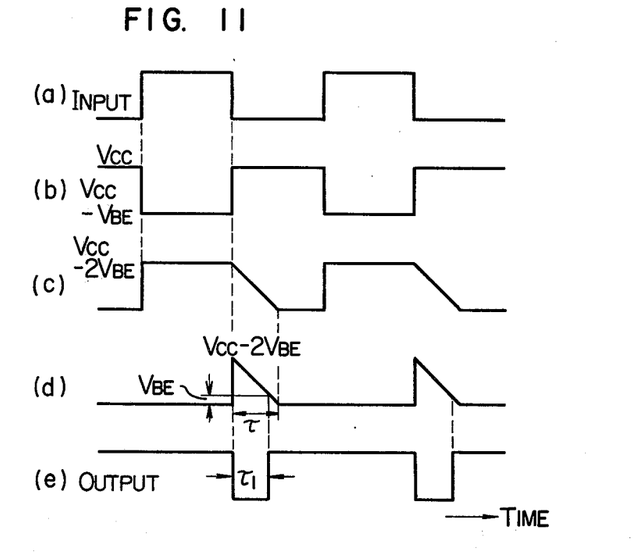
FIG. 11 shows the waveform at each part.

First of all, an embodiment of the inventive trigger pulse generating circuit will be explained with reference to FIGS. 10 and 11. Resistors $R_{13}$ and $R_{14}$ and a transistor $T_{13}$ constitute an inverter circuit section, while resistors $R_{15}$, $R_{16}$ and $R_{17}$ and a transistor $T_{14}$ constitute a constant current source. This constant current source and transistors $T_{15}$ and $T_{16}$ constitute a waveform converter circuit section, and a resistor $R_{18}$ and a transistor $T_{17}$ constitute an emitter follower. Resistors $R_{19}$ and $R_{20}$ and a transistor $T_{18}$ constitute a gate circuit section which gates a waveform inverted output appearing at the emitter of the transistor $T_{17}$ by the input pulse signal. Resistors $R_{21}$ and $R_{22}$ and a transistor $T_{19}$ constitute a detection circuit section which shapes the waveform of the output of the gate circuit.

Next, explanation of the operation of the above detection circuit will be explained. When an input pulse signal (FIG. 11(a)) is applied at one terminal of resistors $R_{13}$ and $R_{19}$ and the base of the transistor $T_{13}$ changes from Low level ($\cong$GND) to High level (higher than $V_{BE}$), transistors $T_{13}$, $T_{15}$ and $T_{16}$ turn on and the emitter of the transistor $T_{16}$ rises rapidly from Low level to High level ($V_{cc} - V_{BE}(T_{16})$). This state is maintained during the period when the input pulse signal is at High level. In this case, the emitter potential of the transistor $T_{17}$ is $V_{cc} - 2V_{BE}$. Next, when the input pulse signal changes from High level to Low level, the transistor $T_{13}$ turns off and the emitter potential ($\approx V_{cc} - V_{BE}(T_{16})$) of transistor $T_{16}$ begins to drop with a given discharge time. If the emitter potential $V_1$ of transistor $T_{14}$ is lower than $V_{BE}$, the emitter potential of the transistor $T_{17}$ drops from $V_{cc} - 2V_{BE}(T_{16}, T_{17})$ to Low level ($\cong$GND) with a discharge time constant $\tau$.

If hFE's of transistors $T_{16}$ and $T_{17}$ are sufficiently large, the discharge time $\tau$ is given by $$\tau = (V_{cc} - 2V_{BE}(T_{16}, T_{17})) \cdot C_T / i_b$$

where $C_T$ is the capacitance between the base and the collector of the transistor $T_{15}$. The base current $i_b$ of the transistor $T_{16}$ becomes $$i_b \approx i_c / h_{FE}(T_{16}),$$

and the collector current $i_c$ of the transistor $T_{14}$ is given by $$i_c \approx \frac{V_1}{R_{17}} \approx \frac{\frac{V_{cc} \cdot R_{16}}{R_{15} + R_{16}} - V_{BE}}{R_{17}}.$$

When the input signal becomes High level (higher than $V_{BE}$) and stays at the level, the transistor $T_{18}$ turns on. Since the waveform converted output (FIG. 11(b)) of the transistor $T_{17}$ is gated by the input pulse signal, the collector of the transistor $T_{14}$ yields a gate output (FIG. 11(d)) which decreases from ($V_{cc} - 2V_{BE}$) with the discharge time $\tau$. Here, it is assumed that the value of the resistor 21 is sufficiently larger than that of the resistor 20.

The transistor $T_{19}$ and the resistors $R_{21}$ and $R_{22}$ constitute the detection circuit section. Only when the gate output obtained at the collector of the transistor $T_{18}$ is above $V_{BE}(T_{19})$, does the transistor $T_{19}$ turn on. Namely, the collector potential of the transistor $T_{19}$ becomes Low level ($\cong$GND) and a shaped output with a pulse width $\tau_1$ (FIG. 11(e)) is obtained from the collector of the transistor $T_{19}$, where $\tau_1$ is given by $$\tau_1 \approx (V_{cc} - 3V_{BE}(T_{16}, T_{17}, T_{19}) \cdot C_T / i_b.$$

In the trigger pulse generating circuit of the inventive type, since the current $i_b$ flowing out can be decreased easily even if the base-collector capacitance $C_T$ of the transistor $T_{15}$ is small, a relatively long delayed pulse output can be obtained. Furthermore, by changing the emitter potential of the transistor $T_{14}$ in the constant current circuit, the width of the delayed pulse output can be easily varied.

Next, explanation will be made of a sample-hold circuit which is a constituent element of this invention.

Figure 12:
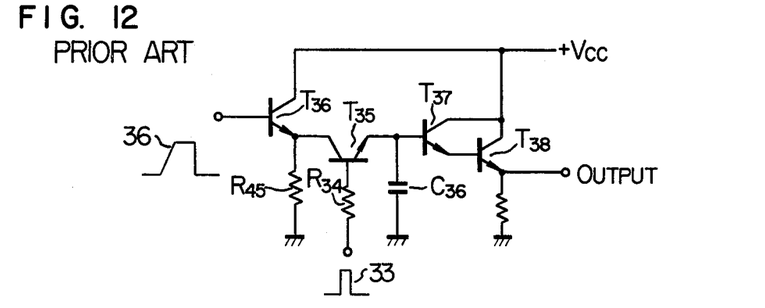
FIG. 12 shows a circuit diagram of a prior art sample-hold circuit.
Figure 13:
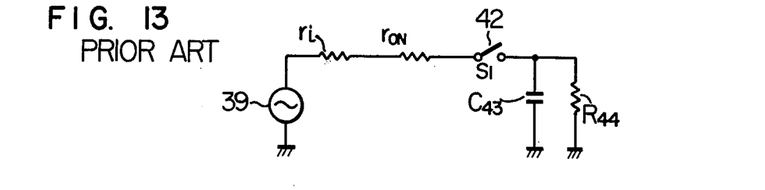
FIG. 13 shows its equivalent circuit.

FIG. 12 shows an example of a prior art sample-hold circuit, where a sample pulse 33 is applied through a resistor $R_{34}$ to the base of a transistor $T_{35}$ and a voltage 36 to be sampled is applied to the collector of the transistor $T_{35}$ through an emitter follower stage of a transistor $T_{36}$. During the presence of the sample pulse, the transistor $T_{35}$ is conducting and a holding capacitor $C_{36}$ is charged or discharged. The voltage at the capacitor $C_{36}$ is held during the period without the sample pulse. A sample-hold output is derived through the transistors $T_{37}$ and $T_{38}$. FIG. 13 shows an equivalent circuit of FIG. 12. In FIG. 13, a signal 39 to be sampled is applied through a signal source resistor $\gamma_i$ to a switching transistor $T_{35}$ represented by a conduction resistor $\gamma_{ON}$ and a switch 42. Only when a sample pulse appears at the base of the transistor $T_{35}$, the transistor $T_{35}$ becomes conductive and hence the switch is closed, and a holding capacitor $C_{43}$ is charged through the resistor $\gamma_{ON}$. A resistor $R_{44}$ is a load resistor satisfying a relation $R_{44} \gg \gamma_i + \gamma_{ON}$. Consider that a sample pulse is applied at the base of the transistor $T_{35}$ and the switch 42 is closed. If the voltage charged in the capacitor $C_{43}$ is lower than the sampled voltage, electric charge flows to the capacitor $C_{43}$ from the sampled voltage side through resistors $\gamma_i$ and $\gamma_{ON}$. In the opposite case, electric charge in the capacitor $C_{43}$ is discharged through the resistors $\gamma_i$ and $\gamma_{ON}$. In this case, since the width of the sample pulse is limited, it is desirable to make $\tau = C_{43}(\gamma_i + \gamma_{ON})$ negligibly smaller than the period of the sample pulse in order to speed up charging and discharging of the capacitor $C_{43}$. To reduce the value of the capacitor $C_{43}$ is not desirable because discharge through the resistor $R_{44}$ in the absence of the sample pulse decreases the held voltage and makes the holding error large. In FIG. 12, charging of the capacitor $C_{36}$ happens easily, while discharge occurring through the resistor $R_{45}$ deteriorates the response. Furthermore, since the output of the sampled voltage is derived through the transistors $T_{36}$, $T_{37}$ and $T_{38}$, it is shifted by a d.c. voltage of about 3 $V_{BE}$ due to the base-emitter voltage ($V_{BE}$) of each transistor. In other words, the output has a temperature dependence of 3 $V_{BE}$. Usually, since $V_{BE}$ is temperature dependent in the order of $-2$ mV/°C., the output variation with a temperature change of 50° C. becomes 300 mV. So, if the circuit is used in a PLL circuit, a phase shift occurs. Especially, the semiconductor integration of the above sample-hold circuit results in an undesirable variation in the sample-hold output because a temperature increase of the tip in time of switch-on of a power source causes a difference from an ambient temperature.

A sample-hold circuit according to this invention is constituted to avoid this shortcoming. Explanation of the circuit will be made next with reference to FIG. 14, where a voltage 47 to be sampled is formed by a constant current source 48, switches 49 and 50 and a capacitor $C_{51}$. The voltage is received by a complementary connection of an NPN transistor $T_{52}$ and a PNP transistor $T_{53}$ and supplied from the emitter of the transistor $T_{52}$ to the collector of a switching transistor $T_{54}$ as a low output impedance signal. A resistor $R_{55}$ connected to the emitter of the NPN transistor $T_{52}$ is an emitter follower resistor. A part of the sampled voltage 47 is also received by a complementary connection of an NPN transistor $T_{56}$ and a PNP transistor $T_{57}$. The PNP transistor $T_{58}$ whose base and collector are connected causes a level shift to a lower level by $V_{BE}$. The voltage level is divided by resistors $R_{59}$ and $R_{60}$ and applied to the base of a PNP transistor $T_{61}$. The resistor $R_{59}$ has a value much smaller than that of the resistor $R_{60}$. The emitter of the PNP transistor $T_{61}$ is connected to the collector of the switching transistor $T_{54}$. When a sample pulse is applied to the base of the transistor $T_{54}$, the transistor $T_{54}$ becomes conducting and a holding capacitor $C_{63}$ either charges or discharges. Even in the absence of the sample pulse, the voltage held by the capacitor $C_{63}$ is received by a complementary connection of a PNP transistor $T_{65}$ and an NPN transistor $T_{66}$. A transistor $T_{67}$ whose base and collector are connected causes a level shift to a higher level by $V_{BE}$. The output of the sample-hold circuit is derived from the emitter of an emitter follower formed by an NPN transistor $T_{68}$. A resistor $R_{69}$ is an emitter resistor and a resistor $R_{70}$ is a base resistor of the emitter follower.

Figure 14:
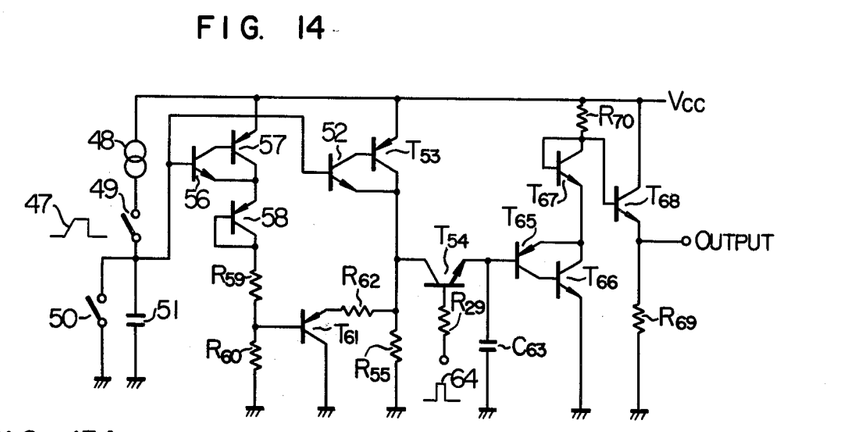
FIG. 14 shows a concrete circuit diagram of a novel sample-hold circuit which is a constituent element of this invention.

Since the voltage 47 to be sampled is received by a high impedance circuit of a composite transistor of complementary connection, it is free from any influence of the sample-switch circuit.

Consider a case when a sample pulse 64 is applied to the base of the transistor $T_{54}$ and the transistor $T_{54}$ becomes conducting. In this case, if the sampled voltage at the emitter of the transistor $T_{52}$ is higher than the voltage at the holding capacitor $C_{63}$, a current flows from the emitter of the transistor $T_{52}$ toward the transistor $T_{54}$ to charge the capacitor $C_{63}$. On the other hand, if the voltage at the capacitor $C_{63}$ is higher than the emitter voltage of the transistor $T_{52}$, the electric charge in the holding capacitor $C_{63}$ is discharged through the transistor $T_{54}$, the resistor $R_{62}$ and the transistor $T_{61}$.

In any case, since the signal source impedance of the sampled voltage at the emitter of the transistor $T_{52}$ is extremely small, charging and discharging of the holding capacitor $C_{63}$ occur very quickly. Hence, the sample error is extremely small. When the transistor $T_{54}$ becomes non-conducting, the electric charge in the holding capacitor $C_{63}$ is discharged through a load resistor, which is nearly equal to the product of the current amplification factors of the transistors $T_{65}$ and $T_{66}$ and the value of the resistor $R_{70}$. Since the value of the load resistor becomes very large, the holding error is extremely small.

The d.c. level of the sampled voltage is derived, after being shifted to a lower level by $V_{BE}$ at the emitter of the transistor $T_{52}$ of complementary connection of the transistors $T_{52}$ and $T_{53}$, shifted to a higher level by $V_{BE}$ by a composite transistor of transistors $T_{65}$ and $T_{66}$, shifted to a higher level by $V_{BE}$ by the transistor $T_{67}$, and shifted to a lower level by $V_{BE}$ by the emitter follower of the transistor $T_{68}$. The d.c. level of a part of the sampled voltage 47 is shifted to a lower level by $V_{BE}$ at the emitter of the transistor $T_{56}$, shifted to a lower level by $V_{BE}$ by the transistor $T_{58}$, and shifted to a higher level by $V_{BE}$ by the transistor $T_{61}$, and, therefore, equal to the level obtained by the path through the transistor $T_{52}$ and $T_{53}$. Further, if $V_{BE}$ of the composite transistor of the transistors $T_{52}$ and $T_{53}$ is equal to $V_{BE}$ of the composite transistor of the transistors $T_{65}$ and $T_{66}$ and if $V_{BE}$ of the transistor $T_{67}$ is equal to $V_{BE}$ of the transistor $T_{68}$, the sampled voltage source 47 becomes equal to the sample-hold output so that the temperature dependence is extremely small.

Next, consider the case when the input terminal continues to have no input, that is, when both the switches 49 and 50 are off and the switching transistor $T_{54}$ continues to be conducting. The first complementary connection stage of the transistors $T_{56}$ and $T_{57}$ and the second complementary connection stage of the transistors $T_{52}$ and $T_{53}$ are circuits of emitter follower type of an NPN transistor. The capacitor $C_{51}$ is not charged at all. The base potential of the PNP transistor $T_{61}$ is kept at a low level by the resistor $R_{60}$ and its emitter potential becomes $V_{BE}$. The base potential is kept also at a low level through the conducting switching transistor $T_{54}$ and the emitter potential becomes 2 $V_{BE}$. The d.c. potential is shifted to a higher level by $V_{BE}$ by the transistor $T_{67}$ and to a lower level by the transistor $T_{68}$. As a result, the output voltage of the sample-hold circuit becomes 2 $V_{BE}$, namely an extremely low potential is derived.

Therefore, in the application of the circuit to a motor speed control system, even under the continual condition without input at the input terminal, the present sample-hold circuit, being kept at a low level of 2 $V_{BE}$, does not give any high voltage during the stop period of the motor. This enables the start of the motor.

As described above, the sample-hold circuit of this invention has a good response and hence a small sample error. Furthermore, since the load resistance is large, the discharge of the electric charge from the holding capacitor during the non-conductive period of the sample-switch transistor is extremely small and hence the holding voltage error is extremely small. Since the level shift of the sampled voltage is given by $V_{BE}$ of the transistors, the sample-hold output has an extremely small temperature dependence. Even under the condition that the sample-hold circuit has no input of a voltage to be sampled, the output voltage can maintain a low value.

Next, explanation will be made of a sample switch circuit used in the sample-hold circuit which is a constituent element of this invention.

Figure 15A:
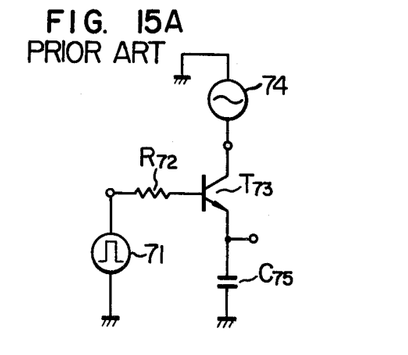
FIG. 15A and FIG. 15B show prior art switching circuits used in the sample-hold circuit according to this invention.
Figure 15B:
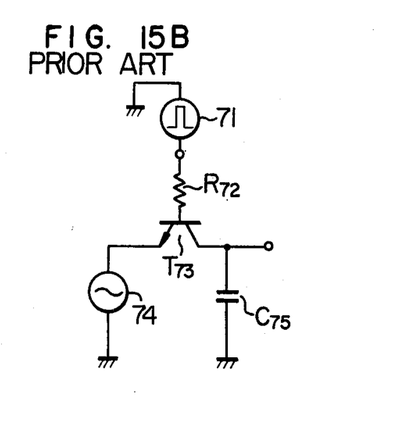

FIG. 15A and FIG. 15B show sample switch circuits that have been used in the sample-hold circuit. It is so arranged that a sample pulse 71 is applied to the base of a transistor 73 through a resistor $R_{72}$, a sampled voltage source 74 is connected to the collector (FIG. 15A) or the emitter (FIG. 15B), and a sample output is derived from a capacitor 75 connected to the emitter or the collector. In this construction, in the absence of the sample pulse the base of the transistor $T_{73}$ is grounded through a resistor $R_{72}$. Namely, since the base potential of the transistor $T_{73}$ is zero, the potential between the base and the emitter of the transistor $T_{73}$ is reversely biased by the holding voltage of the capacitor $C_{75}$ in the circuit of FIG. 15A, while reversely biased by the sampled voltage 74 in the circuit of FIG. 15B.

This fact is a large problem in the case of integrating the sample circuit. Usually, the reverse breakdown voltage between the base and the emitter of a transistor is about 7 V. So, the sampled voltage and the holding voltage should be less than 7 V. The dynamic range of the sample-hold circuit is therefore limited.

The current amplification factor when a current flows from the collector to the emitter of a transistor is large, while it is extremely small when the current flows from the emitter to the collector. In FIG. 15A, charging of the capacitor $C_{75}$ occurs rapidly by discharging takes a long time.

The aim of a sample switch circuit used in this invention is to increase the dynamic range of sample-hold and decrease the resistance of a switching transistor in time of conduction thereby to ensure an accurate sample-hold.

Figure 16:
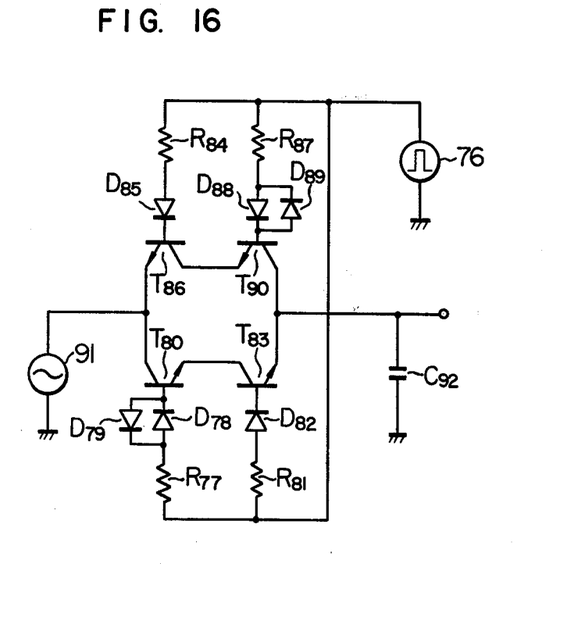
FIG. 16 is a concrete circuit diagram showing a novel switching circuit of a sample-hold circuit which is a constituent element of this invention.

In FIG. 16, a sample pulse 76 is applied to the base of a first transistor $T_{80}$ through a resistor $R_{77}$ and diodes $D_{78}$ and $D_{79}$ connected in parallel with opposite polarity, to the base of a second transistor $T_{83}$ through a resistor $R_{81}$ and a diode $D_{82}$, to the base of a third transistor $T_{86}$ through a resistor $R_{84}$ and a diode $D_{85}$, and to the base of a fourth transistor $T_{90}$ through a resistor $R_{87}$ and diodes $D_{88}$ and $D_{89}$ connected in parallel with opposite polarity. A sampled voltage source 91 is connected to the collector of the transistor $T_{80}$ and the emitter of the transistor $T_{86}$. A holding capacitor $C_{92}$ is connected to the emitter of the transistor $T_{83}$ and the collector of the transistor $T_{90}$. Furthermore, the emitter of the transistor $T_{80}$ is connected to the collector of the transistor $T_{83}$, while the collector of the transistor $T_{86}$ is connected to the emitter of the transistor $T_{90}$.

When a sample pulse is applied to the base of each transistor, each transistor becomes conducting. In the case when the holding capacitor $C_{92}$ is charged from a sampled voltage source 91, electric charge moves through the transistors $T_{80}$ and $T_{83}$. In the case when the holding capacitor $C_{92}$ discharges toward the sampled voltage source 91, an electric charge moves through the transistors $T_{90}$ and $T_{86}$. Both charging and discharging occur rapidly.

Next, in the absence of the sample pulse since the transistor $T_{83}$ and the diode $D_{82}$ are reversely biased by the holding voltage of the capacitor $C_{92}$, the allowed voltage for the capacitor $C_{92}$ becomes twice the reverse breakdown voltage between the base and the emitter, i.e about 14 V. Likewise, the allowed voltage for the sampled voltage becomes about 14 V by the transistor $T_{86}$ and the diode $D_{85}$. If a plurality of diodes are connected to the base, the allowed voltage can be made larger.

At the instant when the sample pulse disappears, the bases of the transistors $T_{80}$ and $T_{90}$ are grounded through the diodes and resistors and these transistors become nonconducting. Therefore, the sampled voltage does not influence the voltage of the holding capacitor during the period when no sample pulse appears. The transistors $T_{80}$ can be used satisfactorily with the emitter-collector breakdown voltage of the transistor $T_{83}$ and the base-emitter breakdown voltage of the transistor $T_{80}$. The transistor $T_{86}$ can be used satisfactorily with the emitter-collector breakdown voltage of the transistor $T_{90}$ and the base-emitter break-down voltage of the transistor $T_{86}$.

As described above, the sample-hold circuit of this invention has advantages of an extended dynamic range of sample-hold, a reduction of the resistance $\gamma_{ON}$ of the switch circuit during conducting time, and improved insulation during non-conducting time.

We claim:

1. A speed control circuit for a rotating body comprising:
    means for producing a first signal in response to the rotation of said rotating body,
    a monostable multivibrator circuit adapted to be triggered by a front edge of said first signal to produce an output signal having a prescribed metastable period,
    means for producing a second signal in response to the output signal of said monostable multivibrator circuit,
    means for producing a third signal in response to a logical AND of an inverted signal of said first signal and said second signal,
    a flip-flop circuit set in response to the front edge of said second signal and reset by a signal related to the rear edge of said first signal,
    means for producing a fourth signal in response to the output signal of said flip-flop circuit,
    a time-voltage converter circuit reset by said fourth signal and driven by said third signal,
    means for producing a fifth signal in response to the output signal of said time-voltage converter,
    means for producing a sixth pulse signal appearing in a period other than the metastable period of said second signal and sampling said fifth signal, and a sample-hold circuit which holds the sampled fifth signal to produce a seventh signal thereby controlling the speed of said rotating body.

2. A speed control circuit of a rotating body according to claim 1, wherein said sixth signal is a NOR gate output of said third and second signals.

3. A speed control circuit according to claim 1, wherein said trigger pulse generating circuit comprises a waveform converting circuit for constant current discharging the fall-off of an input pulse signal, a gate circuit for gating the output of said waveform converting circuit by said input pulse signal, and a detection circuit for detecting the output of said gate circuit.

4. A speed control circuit according to claim 4, wherein said waveform converting circuit is so constructed that the electric charge stored in the junction capacitance of a transistor passes through an impedance converting circuit and is discharged at a constant current by a constant current circuit.

5. A speed control circuit according to claim 4, wherein said detection circuit for detecting the output of said gate circuit is constituted by first and second threshold circuits for obtaining outputs of said gate circuit depending on two different thresholds and a second gate circuit for gating the output of said first and second threshold circuits.

6. A speed control circuit according to claim 1, wherein said sample-hold circuit obtains an sample-hold output in such a manner that a signal to be sampled is applied to a first complementary stage with an NPN transistor as the first stage and to an input terminal of a sample switch circuit through a series connection of a PNP transistor with its base and collector connected and an emitter follower stage; a part of said sampled signal is applied to the input terminal of said sample switch circuit through a second complementary connection stage with an NPN transistor as a first stage; a capacitor is inserted between the output terminal of said sample switch circuit and ground; and a sample-hold output is obtained from said output terminal through a series connection of a third complementary connection stage with a PNP transistor as the first stage, an NPN transistor with its base and collector connected, and an emitter follower stage.

7. A speed control circuit according to claim 1, wherein said monostable multivibrator circuit is constructed of a differential detection circuit; said differential detection circuit comprising a constant current source circuit, a transistor differential circuit connected to said constant current source circuit, a transistor detection circuit for detecting the output of said differential circuit; a second transistor having the same construction as that of a first transistor in said detection circuit used as a bias source of said constant current source circuit; a first resistor determining the current value of said constant current source circuit; and, a second resistor connected to the collector of a transistor of said differential circuit, said first and second resistors having a resistance value ratio of 1:2.

8. A speed control circuit according to claim 6, wherein said sample-switch circuit comprises an emitter of a first transistor connected to the collector of a second transistor, the collector of a third transistor connected to the emitter of a fourth transistor, the collector of said first transistor connected to the emitter of said third transistor, an input terminal for a voltage to be sampled connected to the connection of the first transistor collector and third transistor emitter, the emitter of said second transistor connected to the collector of said fourth transistor, a holding capacitor connected to the connection of the second transistor emitter and fourth transistor collector, a sample pulse source connected to the base of said first to fourth transistors through first to fourth diodes in a forward direction respectively, and fifth and sixth diodes connected in a direction opposite to that of said first and fourth diodes and in parallel with said first and fourth diodes connected to the base of said first and fourth transistors respectively.

* * * * *